US 9,280,520 B2

(12) United States Patent
Guenigault et al.

(10) Patent No.: US 9,280,520 B2
(45) Date of Patent: Mar. 8, 2016

(54) SYSTEMS AND METHODS FOR SEMANTIC INFORMATION RETRIEVAL

(75) Inventors: Nicola J. Guenigault, Brighton (GB); Jordan Rhys Powell, Hove (GB); Azriel L. Chelst, Woodmere, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 328 days.

(21) Appl. No.: 13/565,036

(22) Filed: Aug. 2, 2012
(Under 37 CFR 1.47)

(65) Prior Publication Data
US 2014/0039877 A1     Feb. 6, 2014

(51) Int. Cl.
*G06F 7/00* (2006.01)
*G06F 17/00* (2006.01)
*G06F 17/30* (2006.01)
*G06F 17/20* (2006.01)
*G06F 17/28* (2006.01)
*G06F 17/27* (2006.01)
*G06F 17/21* (2006.01)
*G06F 17/22* (2006.01)
*G06F 17/24* (2006.01)
*G06F 17/25* (2006.01)
(Continued)

(52) U.S. Cl.
CPC ............. *G06F 17/21* (2013.01); *G06F 17/271* (2013.01); *G06F 17/278* (2013.01); *G06F 17/279* (2013.01)

(58) Field of Classification Search
CPC . G06F 17/274; G06F 17/289; G06F 17/2872; G06F 17/4448; G06F 17/2785; G06F 17/2735; G06F 17/241; G06F 17/3071; G06F 17/30864; G06F 17/2247; G06F 17/30985; G06F 3/0481

USPC ............... 704/1–10, 250, 240, 270, 257, 255, 704/232, 231, 254; 707/739, 706, 722, 794, 707/737, 769, 749, 741, 723, 705, 738, 755, 707/736, 746, 780, 771, 759; 715/230, 839, 715/854
See application file for complete search history.

(56) References Cited

U.S. PATENT DOCUMENTS 5,960,384 A * 9/1999 Brash ................................ 704/9
5,963,940 A * 10/1999 Liddy et al.
(Continued)

OTHER PUBLICATIONS

R. Mitkov, "Anaphora Resolution: The State of the Art", http://www.sfu.ca/~mtaboada/lot/readings/Mitkov_1999.pdf.*

*Primary Examiner* — Paras D Shah
*Assistant Examiner* — Anne Thomas-Homescu
(74) *Attorney, Agent, or Firm* — Snell & Wilmer L.L.P.

(57) ABSTRACT

A semantic tagging method may add context to a sentence in order to increase search efficiency. Regardless of an author's writing style, translating semantic concepts into tags may increase search efficiency. Automatic semantic tagging of documents may allow semantic search and reasoning. Text for semantic tagging may include an email, a website chat room, an internet forum, or a text message. Additional texts may include aggregating general consensus of an emailed topic across multiple emails, whether in the same email chain or separate emails. To increase search efficiency, the analysis of prior communications within the body of text may comprise analyzing structured contextual information to facilitate with homophora resolution. The structured contextual information may include at least one of a sender email address, one or more recipient email addresses, a subject field, a message date and time stamp, and an attachment title.

12 Claims, 5 Drawing Sheets

(51) Int. Cl.
*G06F 17/26* (2006.01)
*G06F 3/01* (2006.01)
*G06F 3/048* (2013.01)
*G10L 15/16* (2006.01)
*G10L 15/00* (2013.01)
*G10L 15/18* (2013.01)

(56) References Cited

U.S. PATENT DOCUMENTS

| | | | |
|---|---|---|---|
| 6,026,388 A * | 2/2000 | Liddy et al. | |
| 6,076,088 A * | 6/2000 | Paik et al. | |
| 6,154,213 A * | 11/2000 | Rennison et al. | 715/854 |
| 6,275,789 B1 | 8/2001 | Moser et al. | 704/7 |
| 6,810,375 B1 * | 10/2004 | Ejerhed | 704/9 |
| 6,993,476 B1 * | 1/2006 | Dutta | G06F 17/30569 |
| | | | 704/2 |
| 7,434,176 B1 * | 10/2008 | Froloff | 715/839 |
| 7,672,957 B2 * | 3/2010 | Cotichini et al. | 707/794 |
| 7,870,206 B2 * | 1/2011 | Heidloff | G06Q 10/107 |
| | | | 709/200 |
| 8,606,568 B1 * | 12/2013 | Tickner et al. | 704/231 |
| 8,620,909 B1 * | 12/2013 | Rennison | 707/723 |
| 8,738,359 B2 * | 5/2014 | Gupta | G06F 17/2785 |
| | | | 704/1 |
| 8,977,953 B1 * | 3/2015 | Pierre et al. | 715/230 |
| 2002/0069223 A1 * | 6/2002 | Goodisman | G06F 17/3089 |
| | | | 715/201 |
| 2002/0077806 A1 * | 6/2002 | Tarbouriech et al. | 704/4 |
| 2002/0111966 A1 * | 8/2002 | Fukuda | G06F 17/211 |
| | | | 715/230 |
| 2002/0128821 A1 * | 9/2002 | Ehsani | G10L 15/193 |
| | | | 704/10 |
| 2002/0138248 A1 * | 9/2002 | Corston-Oliver et al. | 704/1 |
| 2003/0004937 A1 * | 1/2003 | Salmenkaita | G01C 21/20 |
| 2003/0101047 A1 * | 5/2003 | Panttaja | G06F 17/2785 |
| | | | 704/9 |
| 2003/0167162 A1 * | 9/2003 | Simpson et al. | 704/9 |
| 2003/0233224 A1 * | 12/2003 | Marchisio et al. | 704/4 |
| 2003/0233225 A1 * | 12/2003 | Bond et al. | 704/4 |
| 2004/0006742 A1 * | 1/2004 | Slocombe | G06F 17/2205 |
| | | | 715/234 |
| 2004/0083092 A1 * | 4/2004 | Valles | 704/9 |
| 2005/0055209 A1 * | 3/2005 | Epstein et al. | 704/255 |
| 2005/0108001 A1 * | 5/2005 | Aarskog | 704/10 |
| 2005/0288920 A1 * | 12/2005 | Green et al. | 704/3 |
| 2005/0289168 A1 * | 12/2005 | Green et al. | 707/101 |
| 2006/0080101 A1 * | 4/2006 | Chotimongkol et al. | 704/257 |
| 2006/0178868 A1 * | 8/2006 | Billerey-Mosier | 704/9 |
| 2006/0277029 A1 * | 12/2006 | Green et al. | 704/4 |
| 2007/0073678 A1 * | 3/2007 | Scott | G06F 17/30737 |
| 2007/0073745 A1 * | 3/2007 | Scott et al. | 707/100 |
| 2007/0088785 A1 * | 4/2007 | Cama | G06Q 10/107 |
| | | | 709/206 |
| 2007/0156393 A1 * | 7/2007 | Todhunter | G06F 17/30719 |
| | | | 704/9 |
| 2007/0156669 A1 * | 7/2007 | Marchisio | G06F 17/30731 |
| 2007/0213973 A1 * | 9/2007 | Rehberg et al. | 704/9 |
| 2007/0282592 A1 * | 12/2007 | Huang et al. | 704/9 |
| 2007/0294614 A1 * | 12/2007 | Jacquin | G06F 17/2247 |
| | | | 715/230 |
| 2008/0005086 A1 * | 1/2008 | Moore | G06F 17/30876 |
| 2008/0027893 A1 * | 1/2008 | Cavestro et al. | 707/1 |
| 2008/0221878 A1 * | 9/2008 | Collobert | G06F 17/2785 |
| | | | 704/232 |
| 2008/0221892 A1 * | 9/2008 | Nathan et al. | 704/257 |
| 2008/0275694 A1 * | 11/2008 | Varone | G06F 17/2785 |
| | | | 704/9 |
| 2008/0319735 A1 * | 12/2008 | Kambhatla et al. | 704/9 |
| 2008/0320031 A1 * | 12/2008 | Denoual | 707/102 |
| 2009/0024385 A1 * | 1/2009 | Hirsch | 704/9 |
| 2009/0030686 A1 * | 1/2009 | Weng et al. | 704/240 |
| 2009/0037448 A1 * | 2/2009 | Thomas | 707/101 |
| 2009/0070103 A1 * | 3/2009 | Beggelman | G06F 17/27 |
| | | | 704/9 |
| 2009/0100454 A1 * | 4/2009 | Weber | 725/9 |
| 2009/0112892 A1 * | 4/2009 | Cardie et al. | 707/100 |
| 2009/0119095 A1 * | 5/2009 | Beggelman et al. | 704/9 |
| 2009/0254543 A1 * | 10/2009 | Ber et al. | 707/5 |
| 2009/0271179 A1 * | 10/2009 | Marchisio et al. | 704/9 |
| 2009/0281970 A1 * | 11/2009 | Mika et al. | 706/12 |
| 2009/0326919 A1 * | 12/2009 | Bean | 704/9 |
| 2010/0011076 A1 * | 1/2010 | Shkolnikov | H04L 12/5835 |
| | | | 709/206 |
| 2010/0017839 A1 * | 1/2010 | Song | H04N 21/23614 |
| | | | 725/118 |
| 2010/0030723 A1 * | 2/2010 | Au | 706/55 |
| 2010/0063799 A1 * | 3/2010 | Jamieson | 704/9 |
| 2010/0082575 A1 * | 4/2010 | Walker et al. | 707/706 |
| 2010/0094835 A1 * | 4/2010 | Lu et al. | 707/705 |
| 2010/0114878 A1 * | 5/2010 | Lu et al. | 707/723 |
| 2010/0161313 A1 * | 6/2010 | Karttunen | 704/9 |
| 2010/0161314 A1 * | 6/2010 | Karttunen et al. | 704/9 |
| 2010/0161316 A1 * | 6/2010 | Haug | 704/9 |
| 2010/0161639 A1 * | 6/2010 | Bobrow et al. | 707/759 |
| 2010/0174713 A1 * | 7/2010 | Baessler et al. | 707/736 |
| 2010/0235165 A1 * | 9/2010 | Todhunter | G06F 17/30654 |
| | | | 704/9 |
| 2011/0029530 A1 * | 2/2011 | Knight et al. | 707/737 |
| 2011/0029531 A1 * | 2/2011 | Knight et al. | 707/737 |
| 2011/0035390 A1 * | 2/2011 | Whitehouse | 707/755 |
| 2011/0040552 A1 * | 2/2011 | Van Guilder et al. | 704/4 |
| 2011/0040553 A1 * | 2/2011 | Sasivarman | 704/9 |
| 2011/0087670 A1 * | 4/2011 | Jorstad et al. | 707/741 |
| 2011/0112823 A1 * | 5/2011 | Ylonen | 704/9 |
| 2011/0113047 A1 * | 5/2011 | Guardalben | G06F 17/2785 |
| | | | 707/754 |
| 2011/0119047 A1 * | 5/2011 | Ylonen | 704/9 |
| 2011/0119049 A1 * | 5/2011 | Ylonen | 704/9 |
| 2011/0119302 A1 * | 5/2011 | Gorman et al. | 707/771 |
| 2011/0196670 A1 * | 8/2011 | Dang et al. | 704/9 |
| 2011/0208753 A1 * | 8/2011 | Sivadas | 707/749 |
| 2011/0225155 A1 * | 9/2011 | Roulland | G06F 17/30598 |
| | | | 707/737 |
| 2011/0246181 A1 * | 10/2011 | Liang et al. | 704/9 |
| 2011/0257960 A1 * | 10/2011 | Sathish | 704/9 |
| 2011/0295903 A1 * | 12/2011 | Chen | 707/794 |
| 2011/0301941 A1 * | 12/2011 | De Vocht | 704/9 |
| 2012/0166180 A1 * | 6/2012 | Au | 704/9 |
| 2012/0216114 A1 * | 8/2012 | Privault | G06F 3/04883 |
| | | | 715/702 |
| 2013/0018963 A1 * | 1/2013 | Brauff | G06Q 10/107 |
| | | | 709/206 |
| 2013/0024183 A1 * | 1/2013 | Cardie et al. | 704/8 |
| 2013/0041921 A1 * | 2/2013 | Cooper et al. | 707/780 |
| 2013/0054509 A1 * | 2/2013 | Kass et al. | 706/55 |
| 2013/0067319 A1 * | 3/2013 | Olszewski | G06F 17/218 |
| | | | 715/234 |
| 2013/0110804 A1 * | 5/2013 | Davis et al. | 707/706 |
| 2013/0159000 A1 * | 6/2013 | Ju et al. | 704/254 |
| 2013/0166578 A1 * | 6/2013 | Papineni | G06F 17/30994 |
| | | | 707/755 |
| 2013/0262501 A1 * | 10/2013 | Kuchmann-Beauger et al. | 707/769 |
| 2013/0290370 A1 * | 10/2013 | Boguraev et al. | 707/769 |
| 2013/0332450 A1 * | 12/2013 | Castelli | G06F 17/278 |
| | | | 707/722 |
| 2014/0019116 A1 * | 1/2014 | Lundberg et al. | 704/8 |
| 2014/0059031 A1 * | 2/2014 | Green et al. | 707/706 |
| 2014/0142922 A1 * | 5/2014 | Liang et al. | 704/9 |
| 2014/0195539 A1 * | 7/2014 | Chen | 707/739 |
| 2014/0195884 A1 * | 7/2014 | Castelli et al. | 715/201 |
| 2015/0019203 A1 * | 1/2015 | Smith | G06F 17/30796 |
| | | | 704/9 |
| 2015/0039292 A1 * | 2/2015 | Suleman | G06F 17/289 |
| | | | 704/9 |
| 2015/0066479 A1 * | 3/2015 | Pasupalak | G06F 17/27 |
| | | | 704/9 |

* cited by examiner

300

310

From: Ann Wong
Sent: Tuesday, October 35, 3011 10:53 AM
To: Bob Rodriguez
Subject: Case study presentation Bob, I was wondering if there is any vague timeline on when the grads might expect to present their case study material? Just so I know if we need to get on with helping them prepare soon.

Ann

310

From: Ann Wong

Sent: Tuesday, October 35, 3011 10:53 AM

To: Bob Rodriguez

Subject: Case study presentation

Bob,

I was wondering if there is any vague timeline on when the grads might expect to present their case study material? Just so I know if we need to get on with helping them prepare soon.

Ann

*FIG. 3A*

```
┌─────────────────────────────────────────────────────────────┐  320
│  [I] [was] [wondering] [if] [there] [is] [any] [vague] [timeline] [on] [when] [the]  │
│                                                             │
│  [grads] [might] [expect] [to] [present] [their] [case] [study] [material] [?]  │
└─────────────────────────────────────────────────────────────┘
```

```
┌─────────────────────────────────────────────────────────────┐  330
│ (I, PPSS) (was, BEDZ) (wondering, VBG) (if, CS) (there, EX) (is, BEZ) (any, DTI) (vague, JJ) │
│ (timeline, NN) (on, IN) (when, WRB) (the, AT) (grads, NN) (might, MD) (expect, VB) (to, TO) │
│ (present, VB) (their, PP$) (case, NN) (study, NN) (material, NN) (?, .)                    │
└─────────────────────────────────────────────────────────────┘
```

```
┌─────────────────────────────────────────────────────────────┐  340
│ [ Bob ] , { I } was wondering if there is [ any vague timeline ] on when [ the grads ] might expect │
│ to present { their } [ case study material ] ? Just so { I } know if { we } need to get on with helping │
│ { them } prepare soon.                                      │
└─────────────────────────────────────────────────────────────┘
```

```
┌─────────────────────────────────────────────────────────────┐  350
│ Bob, I was wondering if there is any vague timeline on when the grads might expect to present │
│ their case study material?                                  │
└─────────────────────────────────────────────────────────────┘
```

```
┌─────────────────────────────────────────────────────────────┐  360
│ Bob,                                                        │
│ I was wondering if there is any vague timeline on when the grads might expect to present their │
│ case study material? Ann                                    │
└─────────────────────────────────────────────────────────────┘
```

FIG. 3B

SYSTEMS AND METHODS FOR SEMANTIC INFORMATION RETRIEVAL

FIELD OF DISCLOSURE

The present disclosure generally relates to the field of computational linguistics, and more particularly, to semantic processing and information retrieval.

BACKGROUND

Electronic communication technologies (e.g., facsimile, text messaging, instant messaging, emails, and online collaboration solutions such as Hogs and forums) typically make the sharing of information vastly easier and accessible to users. Users across the world are more often collaborating and communicating using such electronic communication technologies due to the increasing ease and access offered.

However, with such vast amounts of information being shared, searching for relevant sources of information, and mining the relevant sources for the correct information is becoming more difficult. To address the growing needs for relevant information retrieval and data mining, specialized services (e.g., search engines) are typically used. Most search engines are generic, and designed to operate based on keywords. Some specialized search engines also offer metadata based searching. However, generating reliable metadata for running such specialized search engines is a difficult, time consuming, and resource intensive activity. Even so, specialized search engines exist that cater to a specific community, such as the scientific community, the medical community, the business research community, the patent community, and so forth.

A large percentage of relevant information lies within the communication of a user with other individuals. Currently, there are few search engines that are powerful enough to effectively mine information contained within communication messages. Most rely on keyword searching, or communication header searching.

SUMMARY

In various embodiments, a computer-based system may be configured to add context to a sentence in order to increase search efficiency. Regardless of an author's writing style, the system may increase search efficiency by translating semantic concepts into tags. Automatic semantic tagging of documents may allow semantic search and reasoning.

Text for semantic tagging may include an email, a website chat room, an internet forum, or a text message. Additional text may include aggregating the general consensus of an emailed topic across multiple emails, whether in the same email chain or separate emails. The tagging process may facilitate tying separate emails based on generated tags.

In various embodiments, a semantic tagging method may comprise retrieving, by a computer-based system for extracting semantic tags from text, a body of text from a data source, parsing the body of text by determining a language and structure of the body of text; tokenizing the body of text by splitting the body of text into individual tokens, generating a tagged body of text by assigning each individual token a part-of-speech tag indicating a grammatical role of the individual token, wherein the grammatical role includes one of a noun, a pronoun, a verb, an adverb, and an adjective. The method may further comprise splitting the tagged body of text into grammatical chunks, identifying named entities within the body of text, resolving the individual tokens having a pronoun grammatical role with corresponding noun phrases, deciding a context and purpose of the body of text, and translating semantic concepts of the body of text into one or more semantic tags, identifying one or more communication topics and presuppositions of the body of text, where the identifying the one or more communication topics and presuppositions comprises analysis of prior communications within the body of text to facilitate the tokenizing the body of text, and generating a list of the one or more semantic tags.

Additionally, in various embodiments, the analysis of prior communications within the body of text may comprise analyzing structured contextual information to facilitate with homophora resolution. The structured contextual information may include at least one of a sender email address, one or more recipient email addresses, a subject field, a message date and time stamp, and an attachment title.

In order to help the semantic tagging, custom terminology may be added to a tagging database. The semantic tagging efficiency may also be increased by weighting the individual tokens having a pronoun grammatical role based on structured contextual information. In one example, weighting the individual tokens may include giving more importance to the structured contextual information. Including and weighting the structured contextual information may help to increase the tagging accuracy to 95% or greater.

Applications for semantic tagging may include hot topic analysis or macro-analysis of a body of text. In various embodiments, email text may be analyzed to determine an employee's general consensus on a specific topic or perhaps overall email workflow. For example, analysis of an employee's email may determine that 18% of the employee's emails dealt with a specific project. Both public levels of information and/or internal information may be applied to add context to the tagging process.

BRIEF DESCRIPTION OF THE DRAWINGS

A more complete understanding of the disclosure may be derived by referring to the detailed description and claims when considered in connection with the FIGURES, wherein like reference numbers refer to similar elements throughout the FIGURES, and:

FIGS. 3A and 3B illustrate exemplary intermediate outputs of various steps of the semantic processing described in FIG. 2, in accordance with various embodiments.

DETAILED DESCRIPTION

Figure 1:
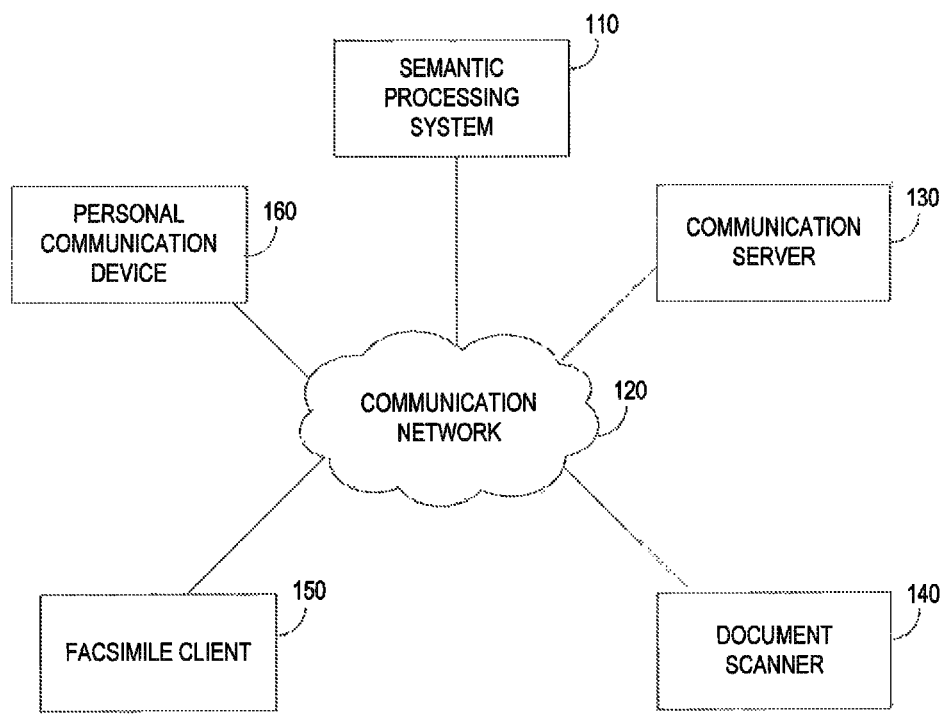
FIG. 1 is an overview of an exemplary environment in which a semantic processing system may be deployed, in accordance with various embodiments.

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Embodiments presented herein are directed towards semantic processing of documents and electronic communications. The semantic processing may add context to text within the documents in order to increase search efficiency. The semantic processing may also allow semantic reasoning for facilitating pattern identification within a group of documents. In accordance with various embodiments, a semantic tagging method may process documents representing communication between two or more individuals, groups or organizations. The documents may include, without limitation, emails, instant message conversations or online chat conversations, internet forums, text messages such as an SMS (short message service) message, and so forth. The semantic tagging method may analyze structured contextual information associated with the documents, such as, but not limited to, sender or author identification, recipients or target audience identification, subject, title, topic of discussion, message date and time stamp, attachment title, and so forth. Analysis of the structured contextual information may facilitate homophora resolution, thus increasing efficiency of searching for information located within the documents, or searching for specific documents. Another application for semantic tagging may include hot topic analysis of the document. The body of text of one or more documents may be analyzed by the semantic processing system to determine general consensus on a specific topic of discussion. Yet another application for semantic tagging may include macro-analysis of one or more documents to derive productivity metrics, for example. For instance, emails can be analyzed for metrics related to process steps and progress timelines of a project.

Various embodiments will now be described in terms of an exemplary semantic processing system, implementing the semantic tagging method, operable in exemplary environments. The nomenclature used herein is for convenience only and is not intended to limit the application of the present disclosure. It will be apparent to one skilled in the relevant art(s) how to implement the present disclosure in alternative embodiments.

In accordance with various embodiments, FIG. 1 illustrates an environment 100 in which a semantic processing system 110 may operate. The semantic processing system 110 communicates, via a communication network 120, with various data sources. The data sources may include a communication server 130, a document scanner 140, a facsimile client 150, and a personal communication device 160.

The semantic processing system 110 processes a body of text obtained or received from the data sources to retrieve semantic information from the body of text. The semantic processing system 110 may translate the retrieved semantic information and concepts into a list of semantic tags. The semantic processing system 110 may store the list of semantic tags into a database, for future use. The semantic tags may include, for example, sender/author, recipient/target audience, topic of discussion, title of document, data and time stamp, and so forth. Various exemplary semantic tagging methods employed by the semantic processing system 110 are described in further detail in conjunction with FIG. 2 and FIGS. 3A and 3B.

In various embodiments, communication network 120 may provide a communication link between the semantic processing system 110 and the data sources, such as the communication server 130, the document scanner 140, the facsimile client 150, and the personal communication device 160. Communication network 120 is capable of providing voice and data communications capabilities. Examples of communication network 120 may include any network, for example, a wide area network (WAN), a local area network (LAN), a personal area network (PAN), an Ethernet, Internet, an Intranet, a cellular network, a satellite network, Public Switched Telephony Network (PSTN) or any other suitable network for transmitting data/voice. Communication network 120 may be implemented as a wired network, or a wireless network or a combination thereof.

The communication server 130 may be any server that provides communication services to client terminals. The communication server 130 may provide communication services to an organization, a business, or any other establishment. Alternatively, communication server 130 may provide communication services to personal client terminals over the Internet. The communication server 130 may include one or more servers, such as, but not limited to, a fax server, an email server, a chat server, a message center server, and so forth. In some embodiments, the communication server 130 may cache and/or archive all documents received from the document scanner 140, the facsimile client 150, and the personal communication device 160. The semantic processing system 110 may communicate with the communication server 130 to retrieve the body of text from relevant documents for processing.

The document scanner 140 may include any device capable of scanning hard copies of documents into a digital representation such as, but not limited to, a Portable Document Format (PDF) file, a text file, an image and so forth. The document scanner 140 may save the digital representation of the hard copies onto the communication server 130. Alternatively, the document scanner 140 may save the digital representation of the hard copies in a local memory, or any other data center connected to the document scanner 140.

The facsimile client 150 is a machine configured to transmit and receive facsimile messages. In various embodiments, the facsimile client 150 may be a physical device. Alternatively, the facsimile client 150 may be a software application miming on a client device, such as the personal communication device 160.

The personal communication device 160 may include any known communication device such as, but not limited to, a personal computer, a mobile phone, a Personal Digital Assistant (PDA), a laptop, a pocket PC, a tablet PC and the like. The communication devices may comprise any hardware and/or software suitably configured to facilitate input, receipt and/or review of information discussed herein. Practitioners will appreciate that the personal communication device 160 may or may not be in direct communication with the semantic processing system 110 and/or the communication server 130. For example, the personal communication device 160 may access the services of the semantic processing system 110 or the communication server 130 through another server. As those skilled in the art will appreciate, the personal communication device may include an operating system (e.g., Microsoft Windows, OS2, UNIX, Linux, Solaris, Apple MacOS, Google Android, etc.) as well as various conventional application software and drivers typically associated with computers. In various embodiments, access to the communication network 120 may be through a commercially available web-browser software package, an email client, an VIP client, or any other network access software.

The semantic processing system 110 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. As will be appreciated by one of ordinary skill in the art, one or more of the components of the semantic processing system 110 may be embodied as a customization of an existing system, an add-on product, upgraded software, a stand alone system, a distributed system, a method, a data processing system, a device for data processing, and/or a computer program product. Accordingly, the semantic processing system 110 components may take the form of an entirely software embodiment, an entirely hardware embodiment, or an embodiment combining aspects of both software and hardware. Furthermore, the semantic processing system 110 components may take the form of a computer program product on a computer-readable storage medium having computer-readable program code means embodied in the storage medium. Any suitable computer-readable storage medium may be utilized, including hard disks, CD-ROM, optical storage devices, magnetic storage devices, secure digital cards, and/or the like.

One skilled in the art will also appreciate that, for security and privacy reasons, any databases, systems, devices, servers or other components of the semantic processing system 110 may consist of any combination thereof at a single location or at multiple locations, wherein each database or system includes any of various suitable security features, such as firewalls, access codes, encryption, decryption, compression, decompression, and/or the like.

In various embodiments, the semantic processing system 110 processes a body of text to analyze the semantic concepts of the information within the body of text and generate semantic tags based on the semantic concepts. As described earlier, the body of text may include, without limitation, an email, a website chat room, an internet forum, a text message, a facsimile message, and so forth. The semantic processing system 110 may retrieve the body of text from one of the various data sources, such as, the communication server 130, the document scanner 140, the facsimile client 150, or the personal communication device 160. Alternatively, each of the various data sources may forward the body of text to the semantic processing system 110, as soon as the data source receives or transmits the body of text. In yet another implementation, a combination of retrieval by the semantic processing system 110, and forwarding by the data sources may be employed.

Figure 2:
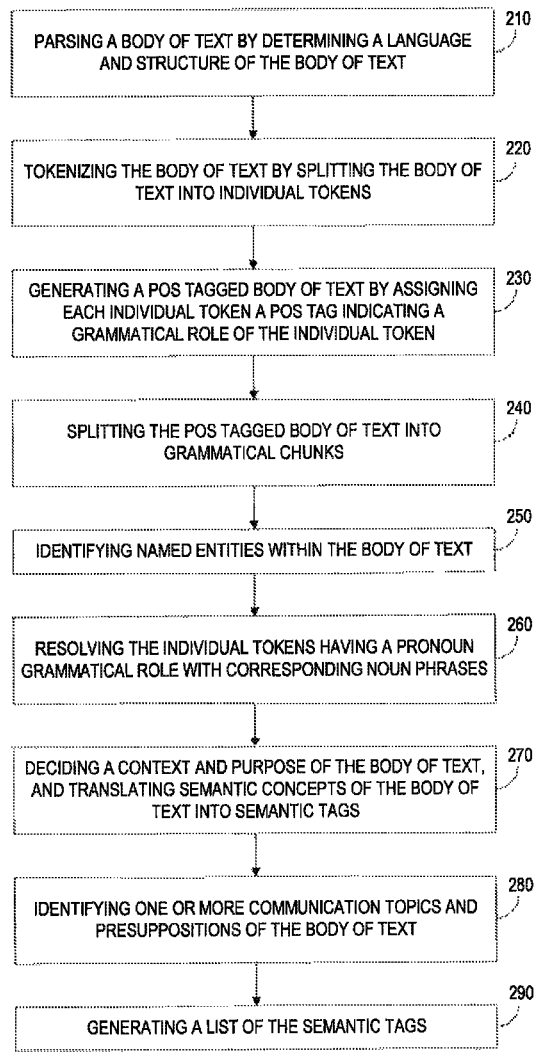
FIG. 2 is a flowchart illustrating an exemplary method of semantic processing, in accordance with various embodiments.

In accordance with various embodiments and with reference to FIG. 2, a flowchart for an exemplary semantic tagging method 200 is illustrated. Further, FIGS. 3A and 3B illustrate intermediate outputs at various steps of the semantic tagging method 200. Once the semantic processing system 110 is in receipt of the body of text, the semantic processing system parses the body of text by determining a language and structure of the body of text (step 210). The semantic processing system 110 may identify structured contextual information from the body of text based on a known format of the body of text. The semantic processing system 110 may select the appropriate known format based on the data source from which the body of text was received. For example, if the body of text is an email, the semantic processing system may use a Multipurpose Internet Mail Extension (MIME) format, to identify a header and an email body. The semantic processing system 110 may then identify the header information, including at least one of a sender email address, one or more recipient email addresses, a subject field, a message date and time stamp, and an attachment title, as the structured contextual information. Similar known formats may be used for text messages, facsimile messages, and so forth, to aid in parsing the body of text. The semantic processing system 110 may also include language detection algorithms, and multi-language processing algorithms to identify the language of the body of text. One example of parsing is illustrated by dotted lines in illustration 310 of FIG. 3A.

Upon parsing the body of text, the semantic processing system tokenizes the body of text by splitting the body of text into individual tokens (step 220). The semantic processing system 110 may use special characters such as punctuations, and spaces to tokenize the body of text. The semantic processing system 110 may tokenize the body of text by splitting the body of text into sentences, and further splitting each sentence into words and punctuation. Thus, each word of the body of text may result in an individual token. One example of the tokenizing is illustrated by dotted lines in illustration 320 of FIG. 3B.

The semantic processing system 110 then generates a tagged body of text by assigning each individual token a part of speech tag (hereinafter, POS tag) indicating a grammatical role of the individual token (step 230). The grammatical roles include one of a noun, a pronoun, a verb, an adverb, an adjective, a conjunction, a preposition, an article, an auxiliary verb, an infinitive, an interjection, modal verb, an object, a participle, a phrase, and a predicate. The semantic processing system 110 may employ POS tagging algorithms, such as the Brown Corpus method, Markov models, Viterbi algorithms, Baum-Welch algorithm, and so forth. Machine learning based algorithms, such as, but not limited to, maximum entropy classifiers, support vector machines, and k-nearest neighbor search and interpolation algorithms, may also be employed for the part of speech tagging. In various embodiments, custom terminology may be added to a tagging database in order to facilitate POS tagging. The combination of custom terminology and POS tagging may aid in improving tagging accuracy to 95% or greater. In other embodiments, the tagging accuracy may be 98% or greater. The semantic processing system 110 associates a POS tag with each individual token of the body of text. One example of the POS tagging is illustrated by the parentheses in illustration 330 of FIG. 3B.

In various embodiments, the semantic processing system 110 splits the POS tagged body of text into grammatical chunks (step 240). The grammatical chunks may include, for example, noun-phrase chunks and pronoun chunks. The semantic processing system 110 employs the POS tags associated with the individual tokens of the body of text for chunking the body of text into noun-phrase chunks and pronoun chunks. One example of the grammatical chunking is shown in illustration 340 of FIG. 3B. The square brackets represent noun-phrase chunks, while the curly braces represent pronoun chunks.

Next, the semantic processing system 110 may identify named entities within the body of text (step 250). The named entities include people, organizations, locations, timeframes and timelines, quantities, monetary values, percentages, and so forth, from the body of text. The semantic processing system 110 may employ grammar based techniques for named entity recognition. Alternatively, the semantic processing system 110 may employ statistical methods for the named entity recognition. Based on the target application of the semantic processing system 110—whether for a single organization, for multiple organizations, or for general public use, and so forth, a suitable grammar based or statistical based named entity recognition algorithm may be employed. One example of the named entity identification is shown in illustration 350 of FIG. 3B. The underlined terms indicate named entities.

In various embodiments, the semantic processing system 110 may resolve the individual tokens having a pronoun grammatical role with corresponding noun phrases (step 260). The semantic processing system 110 may assign weights to the individual tokens having a pronoun grammatical role based on structured contextual information. In some implementations, the semantic processing system 110 may assign a higher weight to those individual tokens that are associated with the structured contextual information. For example, "I" may be weighted higher based on the "sender" field of an email header, "you" may be weighted higher based on the "to" field of the email header, and so forth. Further, the noun phrases "case study material", and "grads" relate to the pronoun chunks "them", and "their" may be resolved using similar weighting of the "subject" field of the email—"Case study presentation". Such a weighting gives more importance to the structured contextual information while resolving the tokens that have a particular pronoun grammatical role, thus aiding in accurate resolution of anaphora and homophora. Incorporating the structured contextual information into the anaphora resolution facilitates a higher accuracy of resolution as compared to other anaphora resolution techniques that do not rely on structured contextual information. Illustration 360 of FIG. 3B shows an example anaphora resolution by arrows directed from the pronoun to the corresponding noun phrase.

In various embodiments, the semantic processing system 110 may integrate homophora resolution into an anaphora resolution algorithm by substituting the structured contextual information into the body of text.

The semantic processing system 110 is configured to decide a context and purpose of the body of text (step 270). The semantic processing system 110 may employ the identified named entities, and the individual tokens having a pronoun grammatical role resolved with corresponding noun phrases to decide the context and purpose of the body of text. The semantic processing system 110 may also employ the structured contextual information to aid in deciding the context and purpose of the body of text. For instance, in the body of text 300 illustrated in FIG. 3A, the semantic processing system 110 may determine based on the anaphora resolution that the email relates to the "grads" and their "case study material". The semantic processing system 110 may exhibit increased accuracy in such a determination due to the structured contextual information being weighted higher. In other words, the subject of the email "Case study presentation" being weighted higher. The anaphora resolution of step 260 that the "case study material" relates to the "grads" aids in such semantic concept retrieval. The semantic processing system 110 then translates the semantic concepts of the body of text into one or more semantic tags.

The semantic processing system 110 may also identify one or more communication topics and presuppositions of the body of text (step 280). In various embodiments, the semantic processing system 110 may analyze prior communications within the body of text to facilitate the tokenizing of the body of text, to identify the communication topics and presuppositions. The prior communications within the body of text may also be analyzed using the structured contextual information to facilitate with homophora resolution. Thus, within a body of text including a chain of communication messages such as email chains, or threaded messages, previous communications also aid in homophora resolution, in addition to the structured contextual information, for greater accuracy in homophora resolution.

Finally, the semantic processing system may integrate inputs form the various steps and generates a list of the semantic tags (step 290). The generated list of semantic tags may include text topic and ideas, authors, people mentioned in text, document type and place of origin, and so forth. The semantic processing system 110 may further link the semantic tags into a network of semantic tags.

While the steps outlined above represent a specific embodiment of the disclosure, practitioners will appreciate that any step may be part of any embodiment, and there are any number of computing algorithms and user interfaces that may be applied to create similar results. The steps are presented for the sake of explanation only and are not intended to limit the scope of the disclosure in any way.

The present disclosure (i.e., semantic processing system 110, process 300 or any part(s) or function(s) thereof) may be implemented using hardware, software or a combination thereof, and may be implemented in one or more computer systems or other processing systems. However, the manipulations performed by the present disclosure were often referred to in terms, such as comparing or checking, which are commonly associated with mental operations performed by a human operator. No such capability of a human operator is necessary, or desirable in most cases, in any of the operations described herein, which form a part of the present disclosure. Rather, the operations are machine operations. Useful machines for performing the operations in the present disclosure may include general-purpose digital computers or similar devices.

Figure 4:
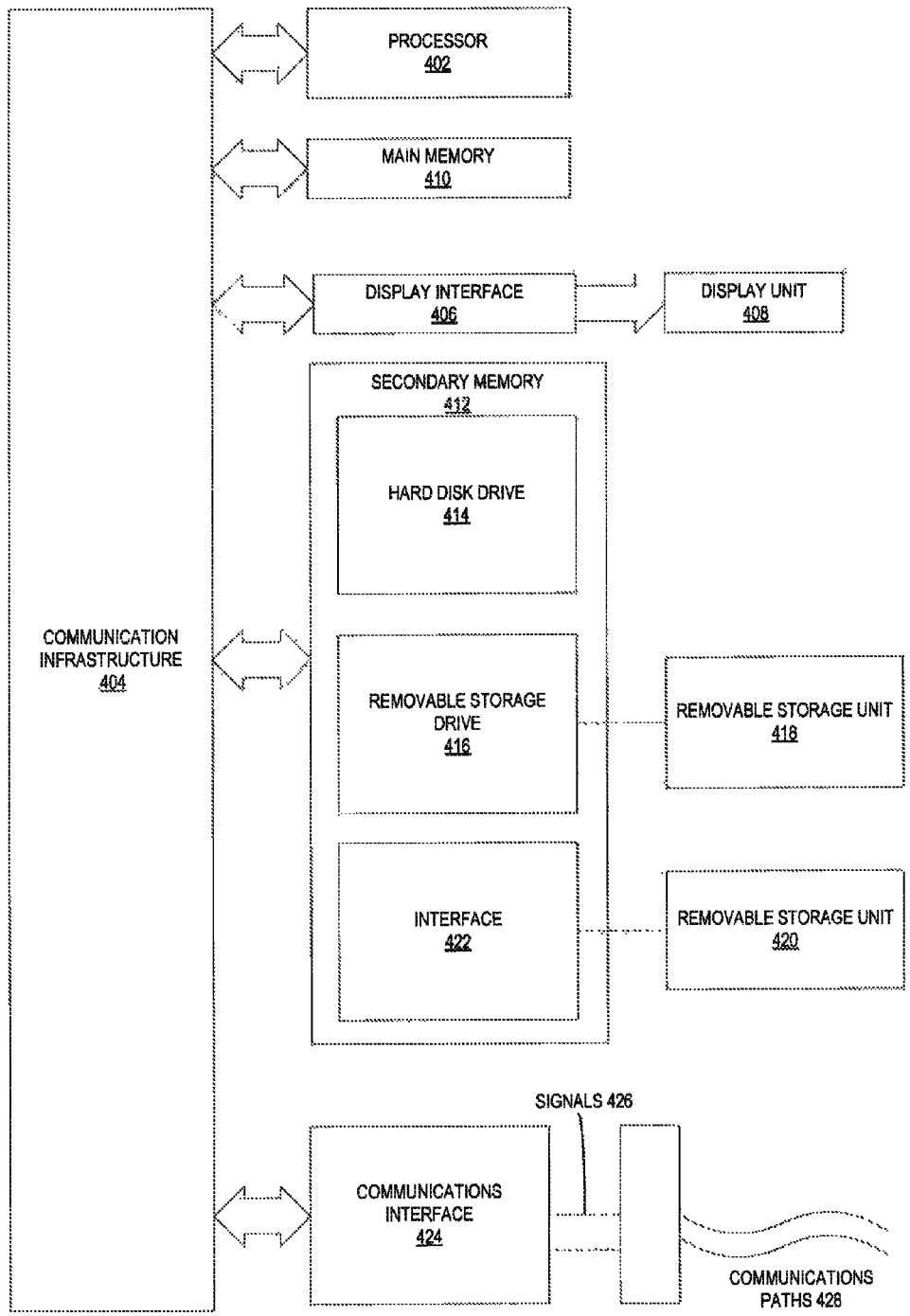
FIG. 4 is a block diagram of an exemplary computer system for implementing the semantic processing system, in accordance with one embodiment.

In fact, in accordance with an embodiment of the present disclosure, the present disclosure is directed towards one or more computer systems capable of carrying out the functionality described herein. An example of the computer systems includes a computer system 400, which is shown in FIG. 4.

The computer system 400 includes at least one processor, such as a processor 402. Processor 402 is connected to a communication infrastructure 404, for example, a communications bus, a cross over bar, a network, and the like. Various software embodiments are described in terms of this exemplary computer system 400. After reading this description, it will become apparent to a person skilled in the relevant art(s) how to implement the present disclosure using other computer systems and/or architectures.

The computer system 400 includes a display interface 406 that forwards graphics, text, and other data from the communication infrastructure 404 (or from a frame buffer which is not shown in FIG. 4) for display on a display unit 408.

The computer system 400 further includes a main memory 410, such as random access memory (RAM), and may also include a secondary memory 412. The secondary memory 412 may further include, for example, a hard disk drive 414 and/or a removable storage drive 416, representing a floppy disk drive, a magnetic tape drive, an optical disk drive, etc. The removable storage drive 416 reads from and/or writes to a removable storage unit 418 in a well known manner. The removable storage unit 418 may represent a floppy disk, magnetic tape or an optical disk, and may be read by and written to by the removable storage drive 416. As will be appreciated, the removable storage unit 418 includes a computer usable storage medium having stored therein, computer software and/or data.

In accordance with various embodiments of the present disclosure, the secondary memory 412 may include other similar devices for allowing computer programs or other instructions to be loaded into the computer system 400. Such devices may include, for example, a removable storage unit 420, and an interface 422. Examples of such may include a program cartridge and cartridge interface (such as that found in video game devices), a removable memory chip (such as an erasable programmable read only memory (EPROM), or programmable read only memory (PROM)) and associated socket, and other removable storage units 420 and interfaces 422, which allow software and data to be transferred from the removable storage unit 420 to the computer system 400.

The computer system 400 may further include a communication interface 424. The communication interface 424 allows software and data to be transferred between the computer system 400 and external devices. Examples of the communication interface 424 include, but may not be limited to a modem, a network interface (such as an Ethernet card), a communications port, a Personal Computer Memory Card International Association (PCMCIA) slot and card, and the like. Software and data transferred via the communication interface 424 are in the form of a plurality of signals, hereinafter referred to as signals 426, which may be electronic, electromagnetic, optical or other signals capable of being received by the communication interface 424. The signals 426 are provided to the communication interface 424 via a communication path (e.g., channel) 428. A communication path 428 carries the signals 426 and may be implemented using wire or cable, fiber optics, a telephone line, a cellular link, a radio frequency (RF) link and other communication channels.

In this document, the terms "computer program medium" and "computer usable medium" are used to generally refer to media such as the removable storage drive 416, a hard disk installed in hard disk drive 414, the signals 426, and the like. These computer program products provide software to the computer system 400. The present disclosure is directed to such computer program products.

Computer programs (also referred to as computer control logic) are stored in the main memory 410 and/or the secondary memory 412. Computer programs may also be received via the communication infrastructure 404. Such computer programs, when executed, enable the computer system 400 to perform the features of the present disclosure, as discussed herein. In particular, the computer programs, when executed, enable the processor 402 to perform the features of the present disclosure. Accordingly, such computer programs represent controllers of the computer system 400.

In accordance with various embodiments, where the disclosure is implemented using software, the software may be stored in a computer program product and loaded into the computer system 400 using the removable storage drive 416, the hard disk drive 414 or the communication interface 424. The control logic (software), when executed by the processor 402, causes the processor 402 to perform the functions of the present disclosure as described herein.

In the various embodiments, the system is implemented primarily in hardware using, for example, hardware components such as application specific integrated circuits (ASIC). Implementation of the hardware state machine so as to perform the functions described herein will be apparent to persons skilled in the relevant art(s). In various embodiments, the various embodiments are implemented using a combination of both the hardware and the software. In various embodiments, the present disclosure is implemented using a combination of both the hardware and the software.

Systems, methods and computer program products are provided, in the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements it should be noted that many alternative or additional functional relationships or physical connections may be present in a practical system.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DST), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

In addition, it should be understood that the figures illustrated in the attachments, which highlight the functionality and advantages of the various embodiments, are presented for example purposes only. The architecture of the various embodiments are sufficiently flexible and configurable, such that it may be utilized (and navigated) in ways other than that shown in the accompanying figures.

The present disclosure is described herein with reference to block diagrams and flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may be present in any number of configurations including the use of windows, web pages, hypertexts, hyperlinks, web forms, popup windows, prompts and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
    receiving, by a computer-based system, a body of text from a data source,
        wherein the body of text is an electronic text and is one of an email, a website chat room, an internet forum, or a text message;
    parsing, by the computer-based system, the body of text by determining a language and structure of the body of text;
    determining, by the computer-based system, a known format of the body of the text;
        wherein the known format is based on the data source from which the body of text was received,
    identifying, by the computer-based system and in response to the determining, structured contextual information based on the known format of the body of the text,
        wherein the structured contextual information includes at least one of a sender email address, one or more recipient email addresses, a subject field, a message date and time stamp, or an attachment title;
    tokenizing, by the computer-based system and in response to the parsing, the body of text by splitting the body of text into individual tokens;
    generating, by the computer-based system and based on the tokenizing, a tagged body of text,
        wherein the generating comprises assigning each individual token a part-of-speech tag indicating a grammatical role of the individual token,
        wherein the part-of-speech tag may include custom terminology from a tagging database, and
        wherein the grammatical role includes one of a noun, a pronoun, a verb, an adverb, an adjective, a conjunction, a preposition, an article, an auxiliary verb, an infinitive, an interjection, modal verb, an object, a participle, a phrase, or a predicate;
    splitting, by the computer-based system, the tagged body of text into grammatical chunks;
    identifying, by the computer-based system, named entities within the body of text;
    resolving, by the computer-based system and based on the tokenizing, the individual tokens having a pronoun grammatical role with corresponding noun phrases;
        wherein the resolving the individual tokens comprises weighting the individual tokens having a pronoun grammatical role based on the structured contextual information,
    deciding, by the computer-based system and in response to the resolving, a context and purpose of the body of text,
    translating, by the computer-based system and in response to the deciding, semantic concepts of the body of text into one or more semantic tags;
    identifying, by the computer-based system and in response to the translating, one or more communication topics and presuppositions of the body of text,
        wherein the identifying the one or more communication topics and presuppositions comprises analysis of prior communications within the body of text to facilitate the tokenizing the body of text,
    wherein the analysis of prior communications within the body of text comprises, in response to the identifying the structured contextual information comprises:
        analyzing structured contextual information to facilitate a homophora resolution; and
        integrating, in response to the analyzing and in response to the weighting of the individual tokens having a pronoun grammatical role based on the structured contextual information, the homophora resolution into an anaphora resolution algorithm by substituting the structured contextual information into the body of text to help interpret the body of text;
    generating, by the computer-based system and in response to the translating, a list of the one or more semantic tags; and
    conducting, by the computer-based system, in response to the translating and using the one or more semantic tags, semantic reasoning to facilitate pattern identification within a group of documents, wherein the pattern identification includes analyzing implied relationships of the text within the group of documents to identify a specific topic, wherein the pattern identification is based on at least one of progress or consensus of the text within the group of documents; and displaying, by the computer-based system, in response to the conducting and to a user interface, the specific identified topic of the body of text.

2. The method of claim 1, wherein the tokenizing further comprises splitting the body of text into sentences, and further splitting each sentence into words and punctuation.

3. The method of claim 2, wherein the grammatical chunks include noun-phrase chunks and pronoun chunks.

4. The method of claim 3, wherein the identifying named entities within the body of text is configured to identify people, organizations, and locations from the body of text.

5. The method of claim 4, wherein the generating the one or more semantic tags includes the one or more semantic tags being at least one of text topic and ideas, authors, people mentioned in text, document type or place of origin.

6. The method of claim 5, further comprising linking the one or more semantic tags into a network of one or more semantic tags.

7. The method of claim 6, wherein the tagging accuracy is 95% or greater.

8. The method of claim 7, wherein weighting the individual tokens includes giving more importance to the structured contextual information.

9. The method of claim 8, wherein the body of text is from a data source.

10. An article of manufacture including a non-transitory, tangible computer readable storage medium having instructions stored thereon that, in response to execution by a computer-based system, cause the computer-based system to perform operations comprising:

receiving, by the computer-based system, a body of text from a data source,
wherein the body of text is an electronic text and is one of an email, a website chat room, an internet forum, or a text message;

parsing, by the computer-based system, the body of text by determining a language and structure of the body of text;

determining, by the computer-based system, a known format of the body of the text;
wherein the known format is based on the data source from which the body of text was received, identifying, by the computer-based system and in response to the determining, structured contextual information based on the known format of the body of the text,
wherein the structured contextual information includes at least one of a sender email address, one or more recipient email addresses, a subject field, a message date and time stamp, or an attachment title;

tokenizing, by the computer-based system and in response to the parsing, the body of text by splitting the body of text into individual tokens;

generating, by the computer-based system and based on the tokenizing, a tagged body of text,
wherein the generating comprises assigning each individual token a part-of-speech tag indicating a grammatical role of the individual token,
wherein the part-of-speech tag may include custom terminology from a tagging database, and
wherein the grammatical role includes one of a noun, a pronoun, a verb, an adverb, an adjective, a conjunction, a preposition, an article, an auxiliary verb, an infinitive, an interjection, modal verb, an object, a participle, a phrase, or a predicate;

splitting, by the computer-based system, the tagged body of text into grammatical chunks;

identifying, by the computer-based system, named entities within the body of text;

resolving, by the computer-based system and based on the tokenizing, the individual tokens having a pronoun grammatical role with corresponding noun phrases;
wherein the resolving the individual tokens comprises weighting the individual tokens having a pronoun grammatical role based on the structured contextual information, deciding, by the computer-based system and in response to the resolving, a context and purpose of the body of text, translating, by the computer-based system and in response to the deciding, semantic concepts of the body of text into one or more semantic tags;

identifying, by the computer-based system and in response to the translating, one or more communication topics and presuppositions of the body of text,
wherein the identifying the one or more communication topics and presuppositions comprises analysis of prior communications within the body of text to facilitate the tokenizing the body of text, wherein the analysis of prior communications within the body of text comprises, in response to the identifying the structured contextual information comprises:
analyzing structured contextual information to facilitate a homophora resolution; and
integrating, in response to the analyzing and in response to the weighting of the individual tokens having a pronoun grammatical role based on the structured contextual information, the homophora resolution into an anaphora resolution algorithm by substituting the structured contextual information into the body of text to help interpret the body of text;

generating, by the computer-based system and in response to the translating, a list of the one or more semantic tags; and conducting, by the computer-based system, in response to the translating and using the one or more semantic tags, semantic reasoning to facilitate pattern identification within a group of documents,
wherein the pattern identification includes analyzing implied relationships of the text within the group of documents to identify a specific topic, wherein the pattern identification is based on at least one of progress or consensus of the text within the group of documents; and displaying, by the computer-based system, in response to the conducting and to a user interface, the specific identified topic of the body of text.

11. A system comprising:

a tangible, non-transitory memory communicating with a processor, the tangible, non-transitory memory having instructions stored thereon that, in response to execution by the processor, cause the processor to perform operations comprising:

receiving, by the processor, a body of text from a data source,
wherein the body of text is an electronic text and is one of an email, a website chat room, an internet forum, or a text message;

parsing, by the processor, the body of text by determining a language and structure of the body of text;

determining, by the processor, a known format of the body of the text;
wherein the known format is based on the data source from which the body of text was received,
identifying, by the processor and in response to the determining, structured contextual information based on the known format of the body of the text,
  wherein the structured contextual information includes at least one of a sender email address, one or more recipient email addresses, a subject field, a message date and time stamp, or an attachment title;
tokenizing, by the processor and in response to the parsing, the body of text by splitting the body of text into individual tokens;
generating, by the processor and based on the tokenizing, a tagged body of text,
  wherein the generating comprises assigning each individual token a part-of-speech tag indicating a grammatical role of the individual token,
  wherein the part-of-speech tag may include custom terminology from a tagging database, and
  wherein the grammatical role includes one of a noun, a pronoun, a verb, an adverb, an adjective, a conjunction, a preposition, an article, an auxiliary verb, an infinitive, an interjection, modal verb, an object, a participle, a phrase, or a predicate;
splitting, by the processor, the tagged body of text into grammatical chunks;
identifying, by the processor, named entities within the body of text;
resolving, by the processor and based on the tokenizing, the individual tokens having a pronoun grammatical role with corresponding noun phrases;
  wherein the resolving the individual tokens comprises weighting the individual tokens having a pronoun grammatical role based on the structured contextual information,
deciding, by the processor and in response to the resolving, a context and purpose of the body of text,
translating, by the processor and in response to the deciding, semantic concepts of the body of text into one or more semantic tags;
identifying, by the processor and in response to the translating, one or more communication topics and presuppositions of the body of text,
  wherein the identifying the one or more communication topics and presuppositions comprises analysis of prior communications within the body of text to facilitate the tokenizing the body of text,
wherein the analysis of prior communications within the body of text comprises, in response to the identifying the structured contextual information comprises:
  analyzing structured contextual information to facilitate a homophora resolution; and
  integrating, in response to the analyzing and in response to the weighting of the individual tokens having a pronoun grammatical role based on the structured contextual information, the homophora resolution into an anaphora resolution algorithm by substituting the structured contextual information into the body of text to help interpret the body of text;
generating, by the processor and in response to the translating, a list of the one or more semantic tags; and
conducting, by the processor, in response to the translating and using the one or more semantic tags, semantic reasoning to facilitate pattern identification within a group of documents,
  wherein the pattern identification includes analyzing implied relationships of the text within the group of documents to identify a specific topic, wherein the pattern identification is based on at least one of progress or consensus of the text within the group of documents; and
displaying, by the processor, in response to the conducting and to a user interface, the specific identified topic of the body of text.

12. The method of claim 1, further comprising identifying a header and an email body of an email, wherein the body of text is the email, and wherein the known format is a Multipurpose Internet Mail Extension (MIME) format.

* * * * *